United States Patent
Nakamura et al.

[11] Patent Number: 6,013,879
[45] Date of Patent: Jan. 11, 2000

[54] MULTI-POINT CELL TYPE WEIGHING MACHINES

[75] Inventors: Yoshihiro Nakamura; Yukio Wakasa; Kazufumi Naito, all of Shiga, Japan

[73] Assignee: Ishida Co., Ltd., Kyoto, Japan

[21] Appl. No.: 08/923,060

[22] Filed: Sep. 3, 1997

Related U.S. Application Data

[63] Continuation of application No. 08/346,437, Nov. 29, 1994, abandoned.

[30] Foreign Application Priority Data

| Dec. 2, 1993 | [JP] | Japan | 5-339578 |
| Dec. 2, 1993 | [JP] | Japan | 5-339579 |
| Nov. 1, 1994 | [JP] | Japan | 6-293744 |

[51] Int. Cl.⁷ .......... G01G 19/22; G01G 21/10; G01G 23/10; G01G 19/00
[52] U.S. Cl. .......... 177/25.13; 177/184; 177/185; 177/199; 702/101; 43/1.13
[58] Field of Search .......... 177/1, 50, 145, 177/199, 200, 185, 25.13, 184; 73/1.13; 364/571.01, 571.02, 571.03, 571.04, 571.05, 571.06, 571.07; 702/101, 102

[56] References Cited

U.S. PATENT DOCUMENTS

| 4,212,361 | 7/1980 | Stocker | 177/200 |
| 4,593,778 | 6/1986 | Konishi et al. | 177/185 |
| 4,624,331 | 11/1986 | Naito | 177/185 |
| 4,660,662 | 4/1987 | Katz | 177/50 |
| 4,751,973 | 6/1988 | Freeman et al. | 177/200 X |
| 4,804,052 | 2/1989 | Griffen | 177/25.14 |
| 4,909,338 | 3/1990 | Vitunic et al. | 177/50 |
| 4,926,359 | 5/1990 | Konishi et al. | 177/25.18 X |
| 5,117,929 | 6/1992 | Nakamura et al. | 177/185 |
| 5,172,783 | 12/1992 | Fienland et al. | 177/185 |
| 5,220,969 | 6/1993 | DeBarber et al. | 177/145 |
| 5,296,655 | 3/1994 | Sargent et al. | 177/199 |
| 5,561,274 | 10/1996 | Brandorff | 117/145 |
| 5,789,713 | 4/1998 | Wakasa et al. | 177/25.13 |

FOREIGN PATENT DOCUMENTS

| 0403200 | 6/1990 | European Pat. Off. . |
| 0622617 | 5/1994 | European Pat. Off. . |

OTHER PUBLICATIONS

Mathematics Made Simple, 5tn Ed., Abraham Sperling, Ph.D, et al. Doubleday, N.Y., N.Y., pp. 10–11, Jun. 1991.

Electric Circuits, 2d Ed., James Nilsson, Addison–Wesley Published Co., reading Mass, pp. 28–33 48–52, 61–63, 81–91, 100–105 & 173, 1986.

Feedback Control of dynamic Systems, Gene franklin, et al., Addison–Wesley Publishing Co., Reading, Mass, pp. 26–31, 49–62, & 540–547, May 1987.

Kochsiek, Handbuch des Waegens, 2nd edition, Braunschweig/Wiesbaden, 1989, pp. 200–201.

Bernd Friedrich Allenberg, Modellierung und optimale Regelung von Differentialdosierwaagen, Dissertation, Karlsruhe, 1991, pp. 51–56.

*Primary Examiner*—Randy W. Gibson
*Attorney, Agent, or Firm*—Majestic, Parsons, Siebert & Hsue P.C.

[57] ABSTRACT

A multi-point cell type weighing machine has a plural number of scale cells set on a floor to support a table and to output weight signals indicative of weights measured thereby of a target object placed on the table. One or more floor vibration detecting cells are set on the same floor and output floor vibration detection signals indicative of the vibrations of the floor. The weight signals are corrected on the basis of vibration components of the floor vibration detection signals. A standard weight is placed at a larger plural number of places on the table than there are scale cells and output sensitivity ratios among the scale cells are calculated from outputted values from the scale cells, and the weight signals are further corrected on the basis of the output sensitivity ratios. These weight signals are added together and the weight of the target object is obtained from the added signal. A plurality of floor vibration detecting cells may be set on the floor, each near different one of the scale cells, or they may be set anywhere on the floor and a mode of floor vibrations may calculated from their outputs. A single floor vibration detecting cell may be set between the scale cells. The table is supported by the scale cells through elastic pieces such that only vertical forces are communicated to the scale cells.

12 Claims, 11 Drawing Sheets

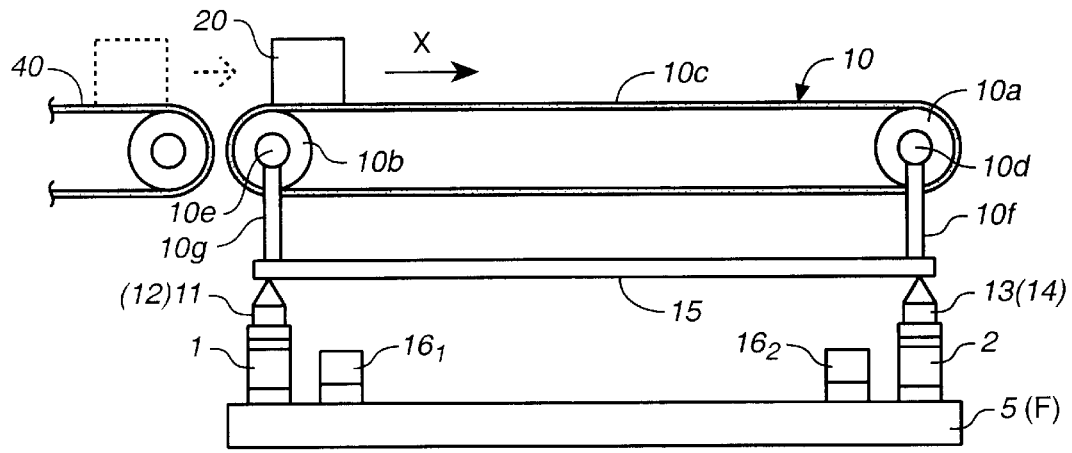
FIG._1
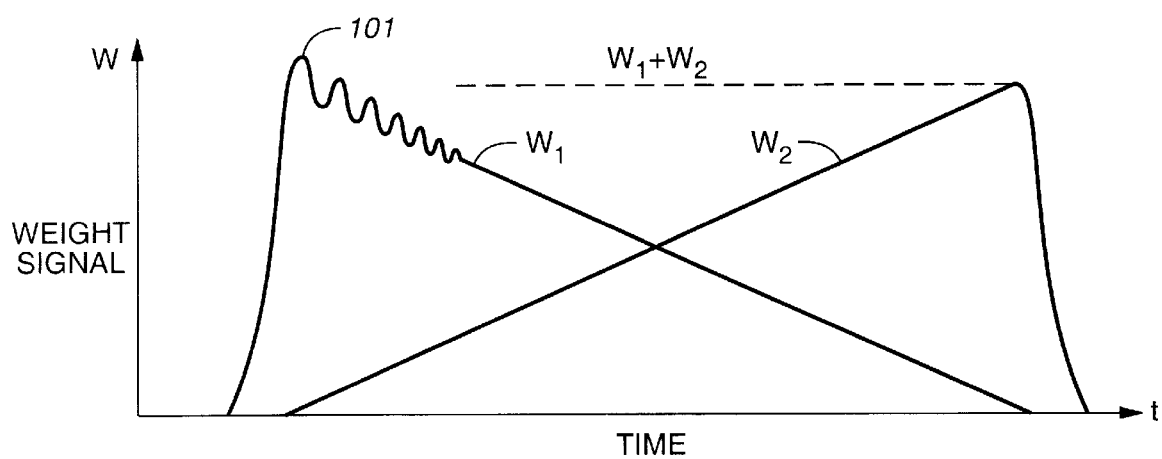
FIG._2
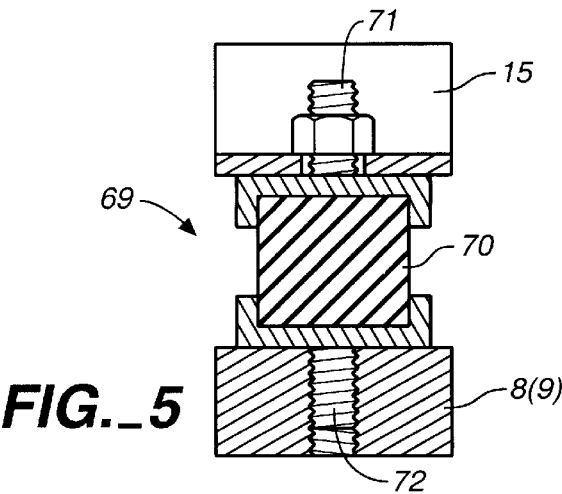
FIG._5

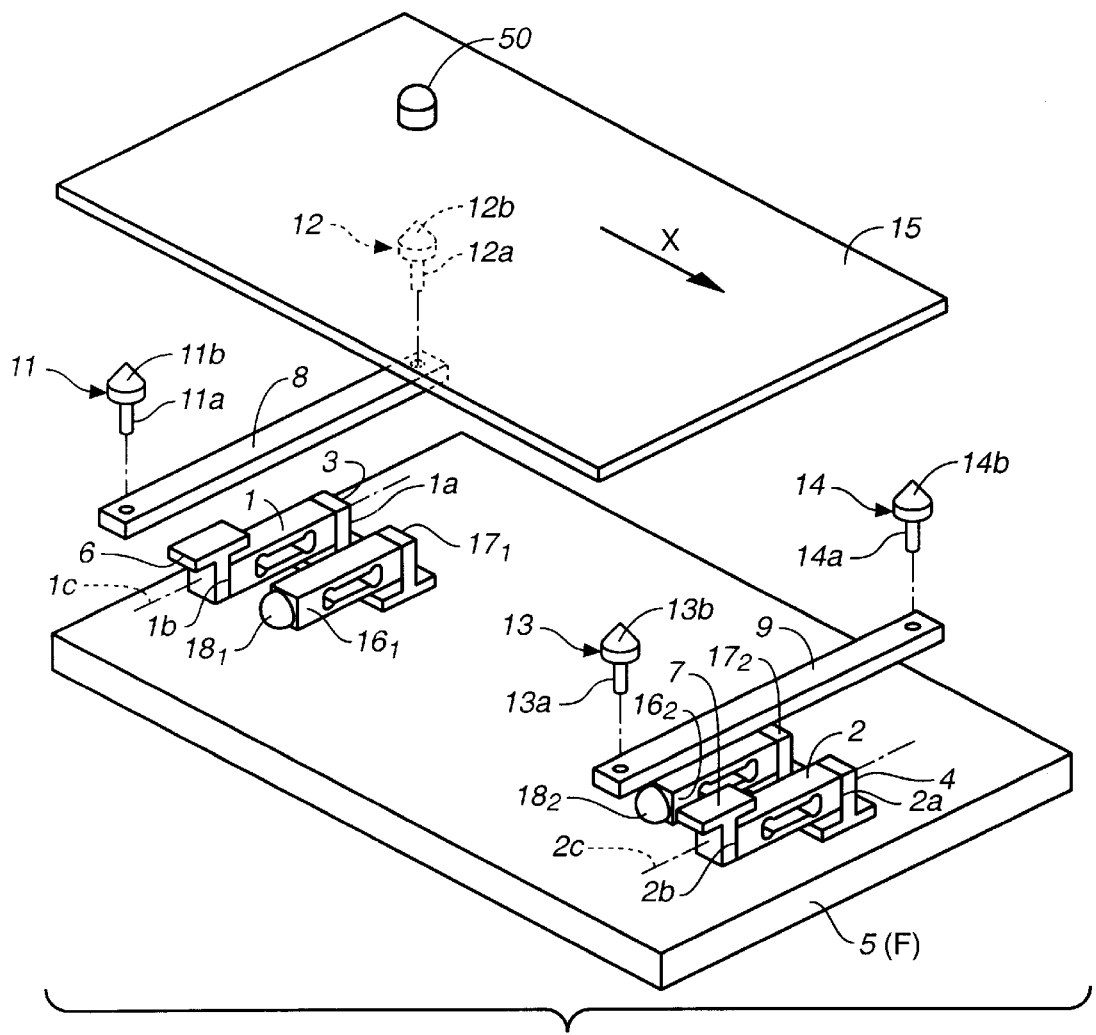
FIG._3
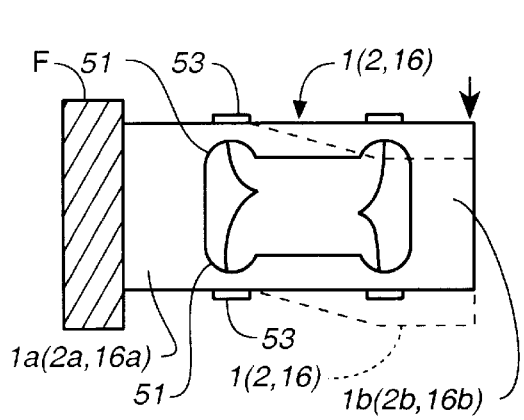
FIG._6
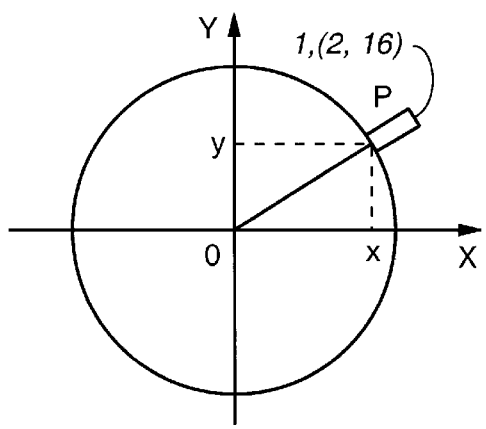
FIG._7

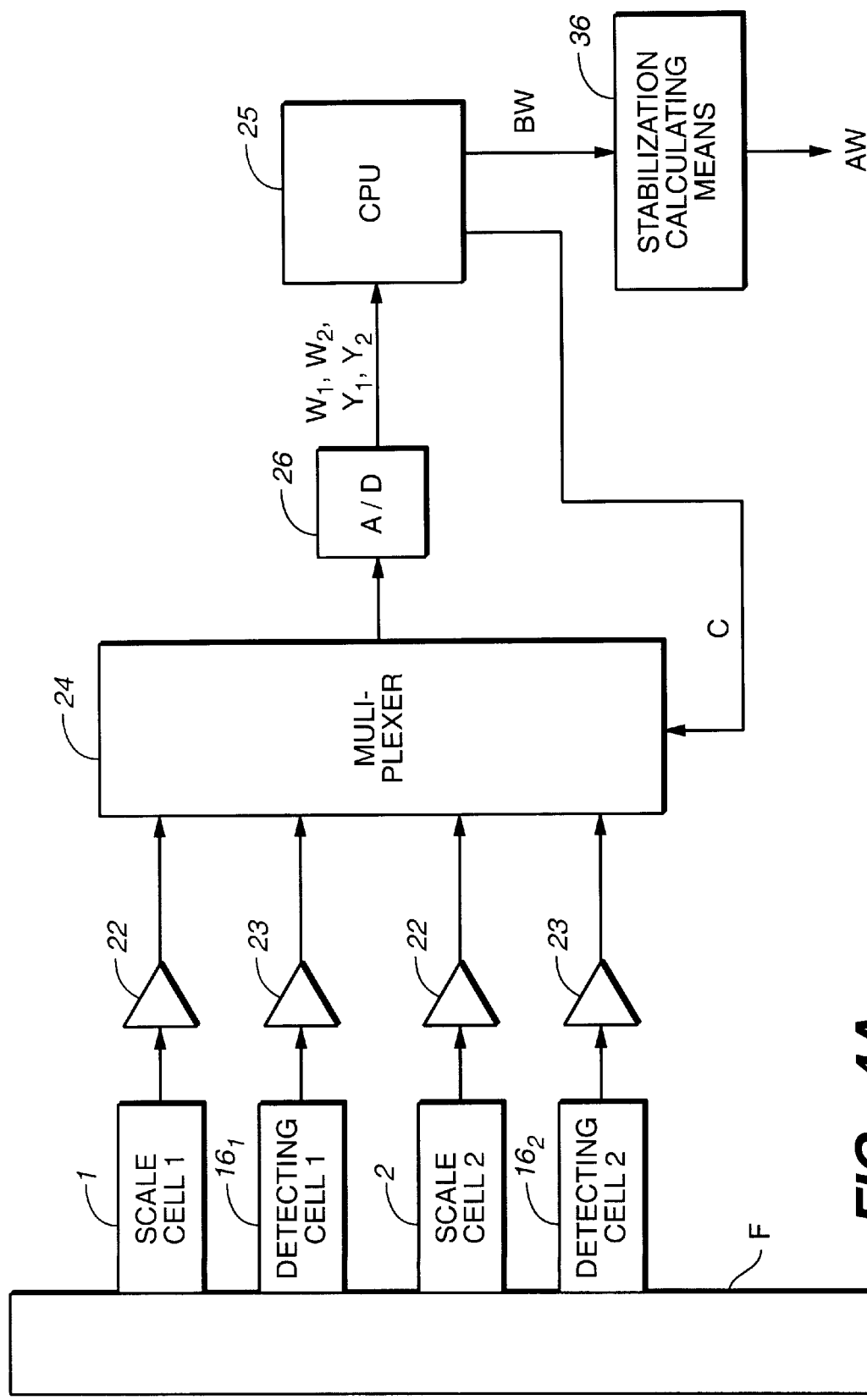
FIG._4A

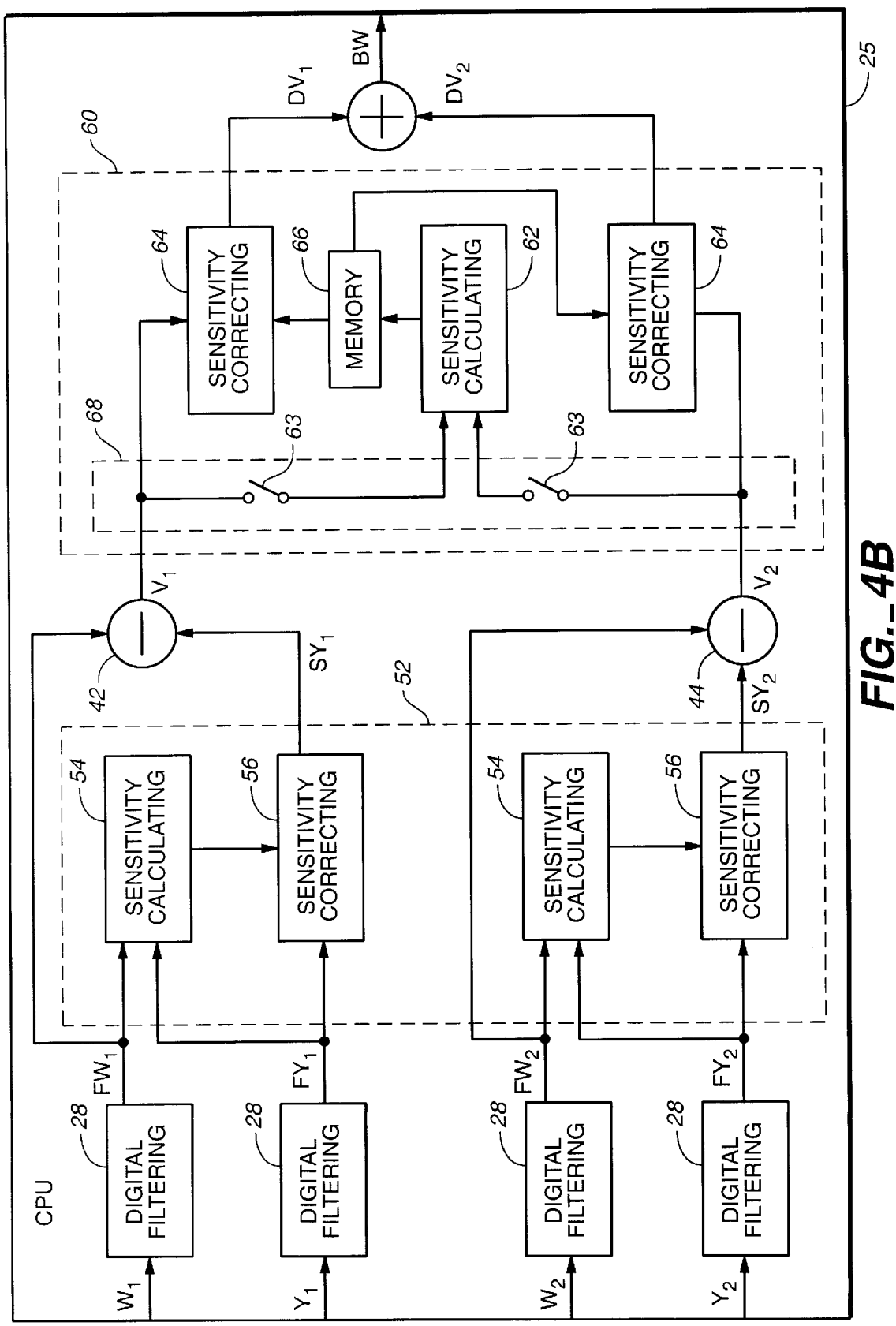
FIG._4B

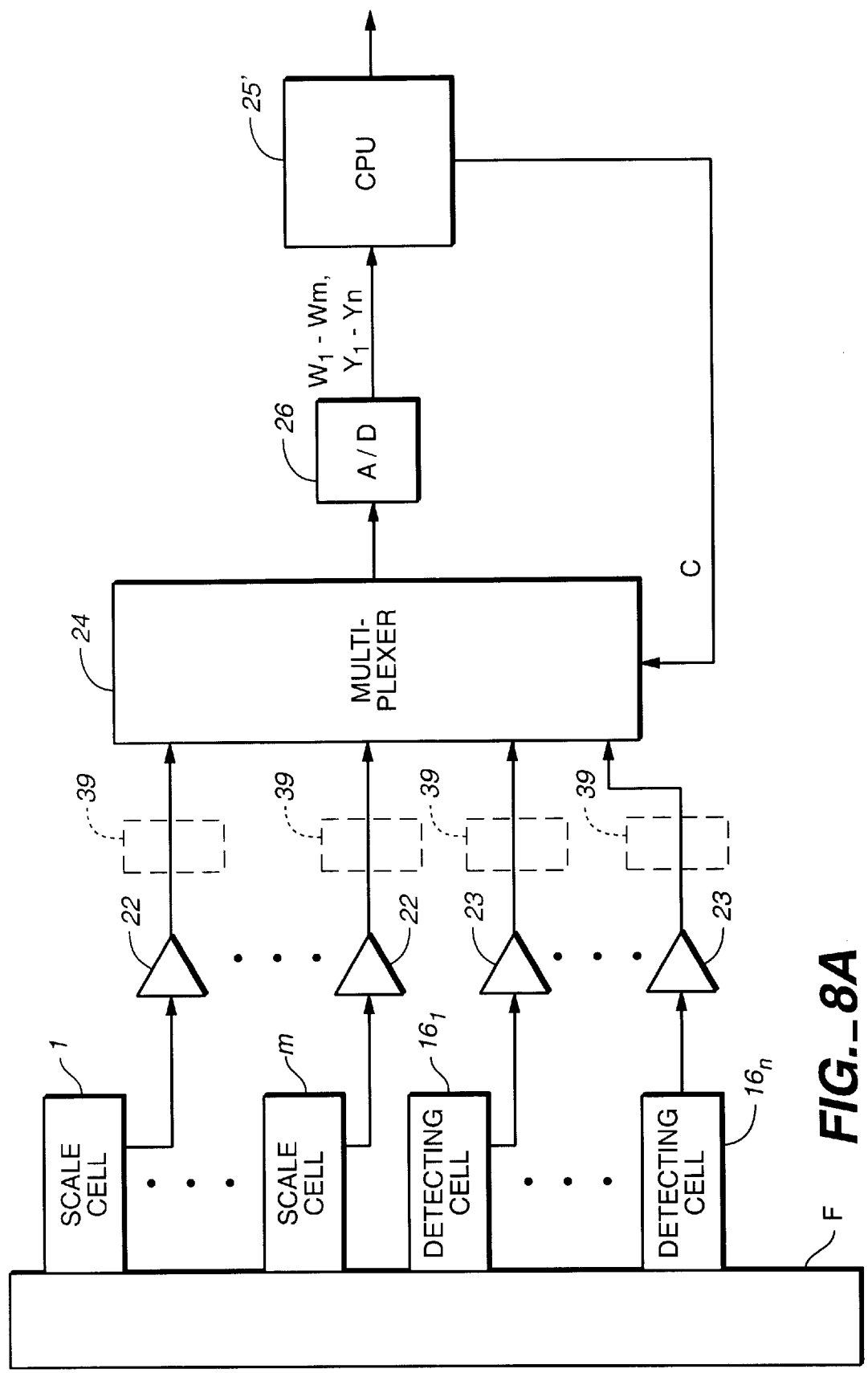
FIG._8A

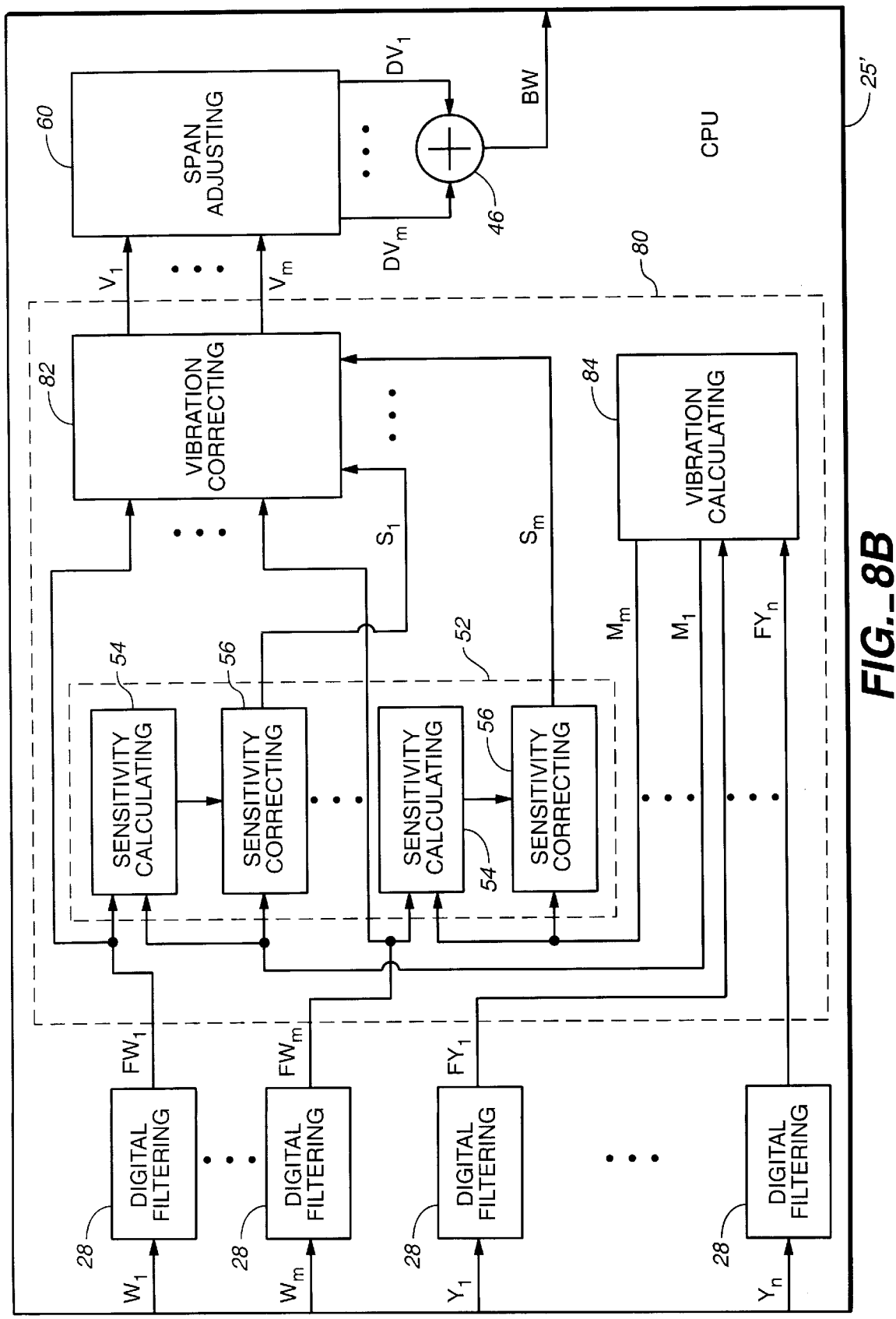
FIG._8B

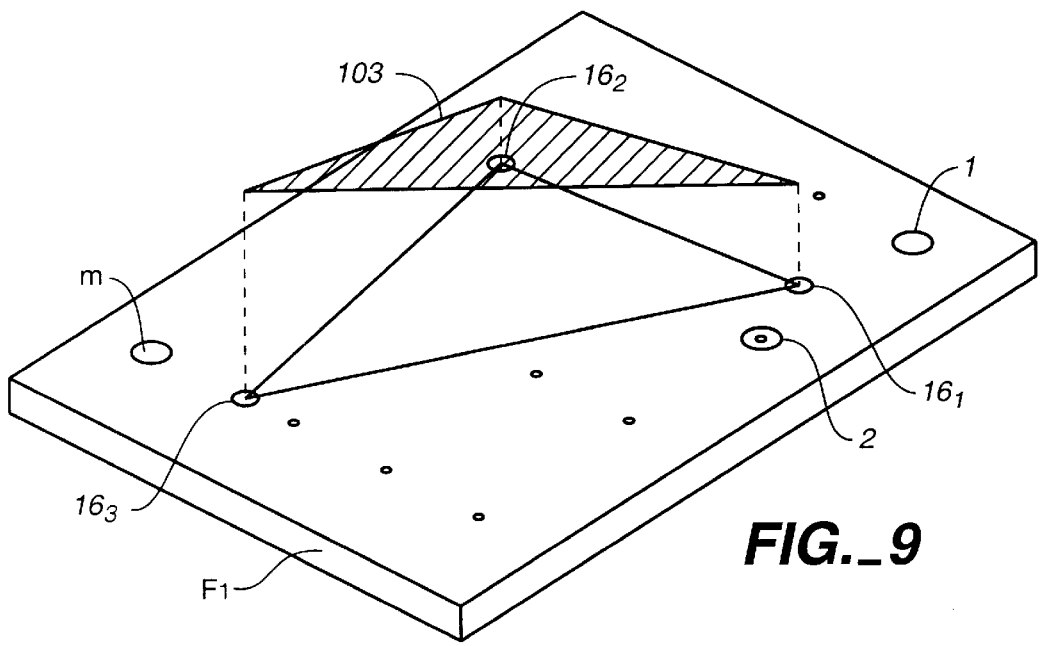
FIG._9
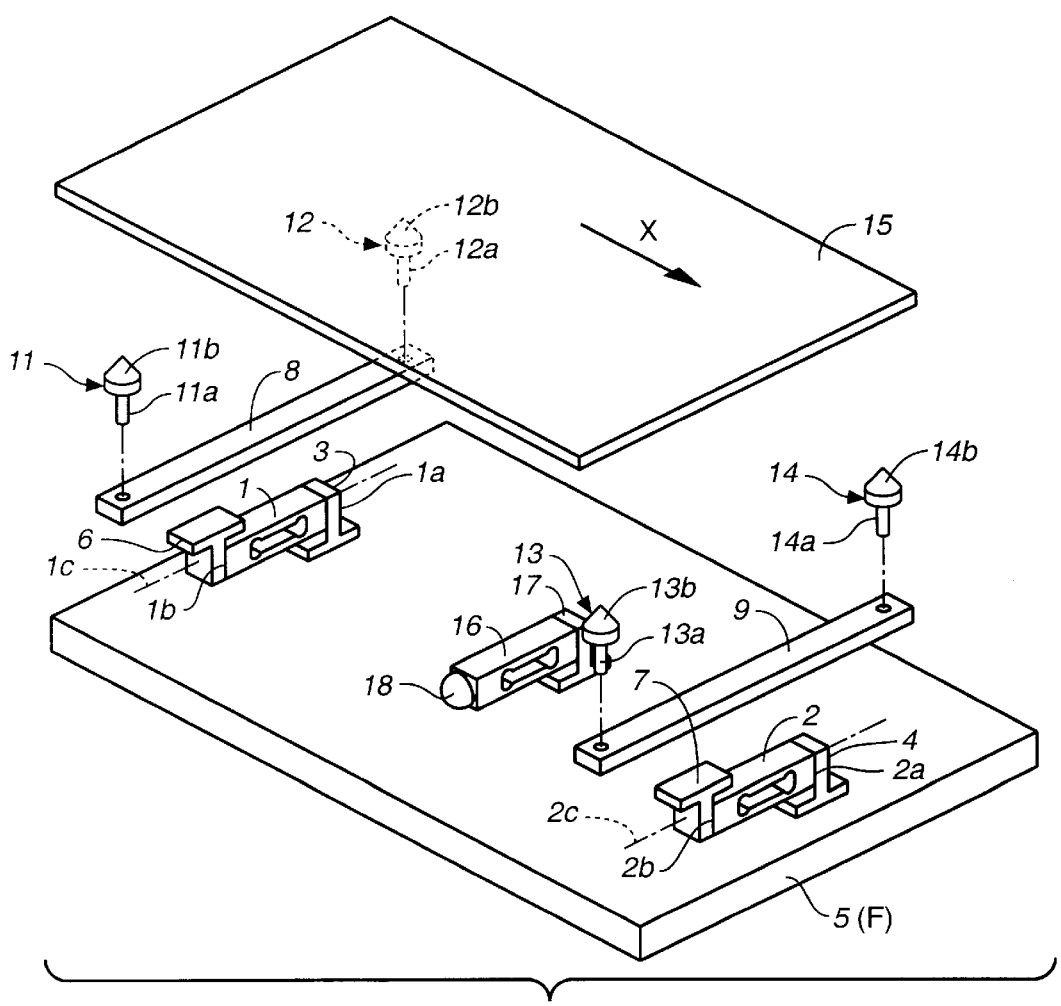
FIG._10

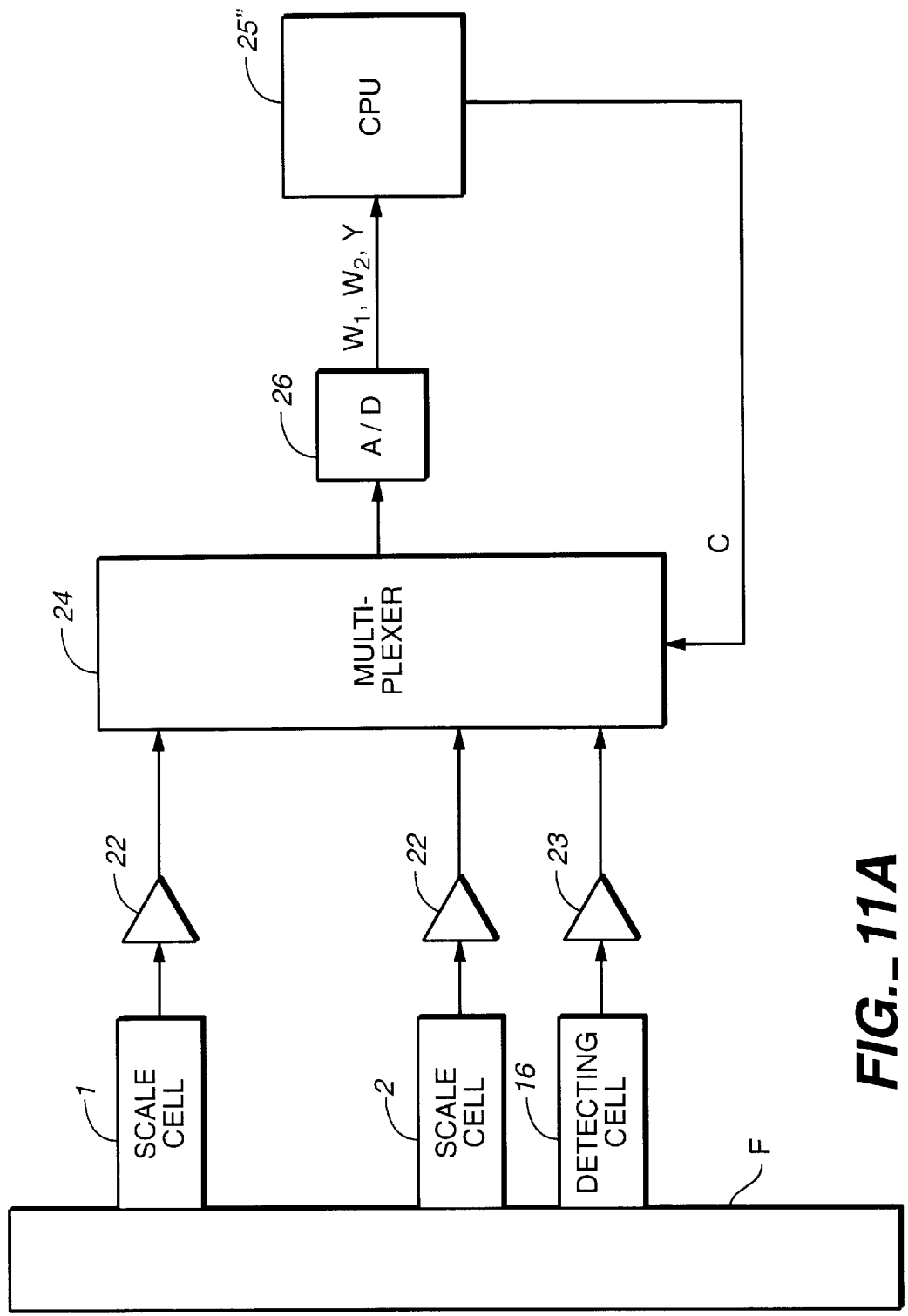
FIG._11A

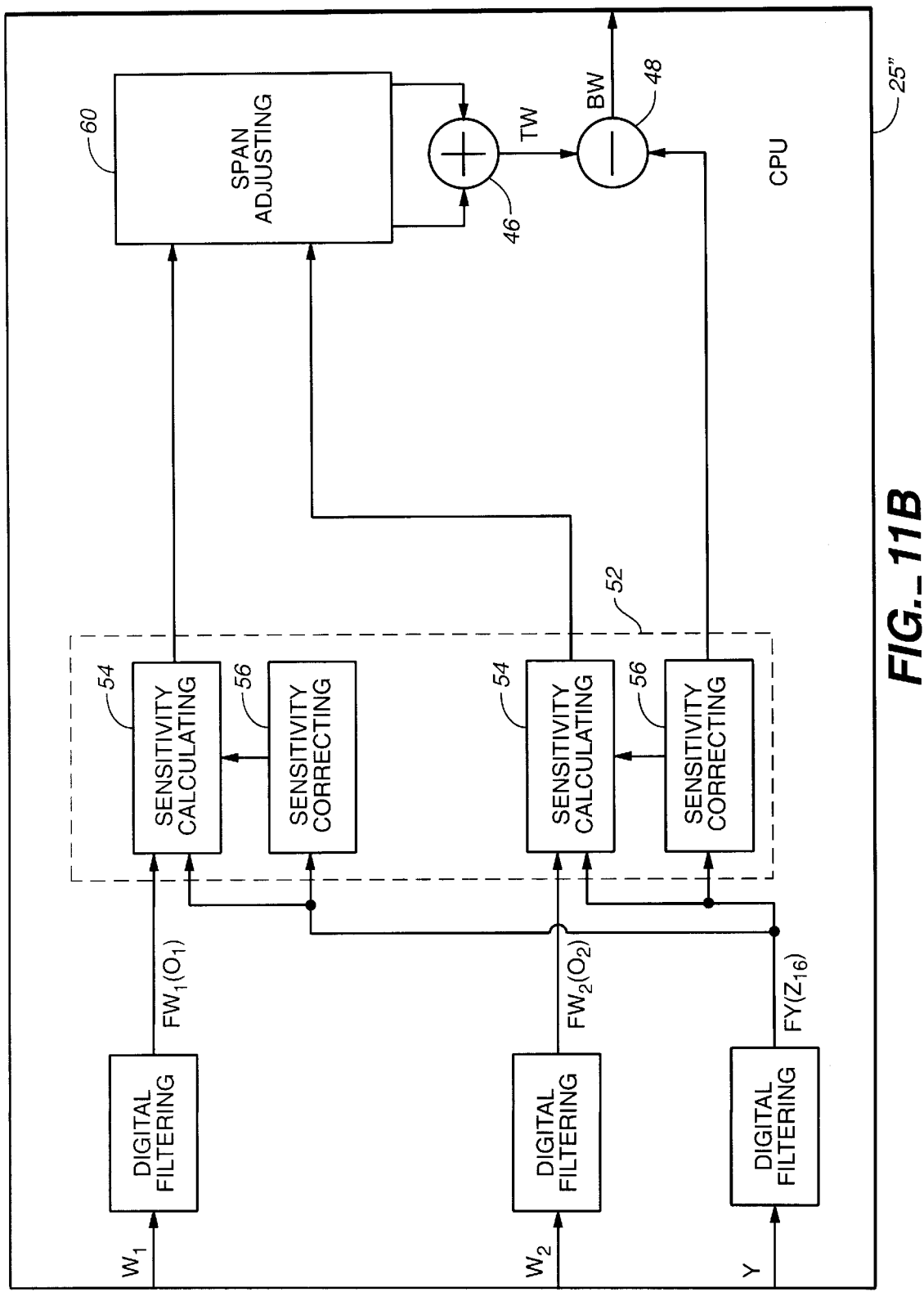
FIG._11B

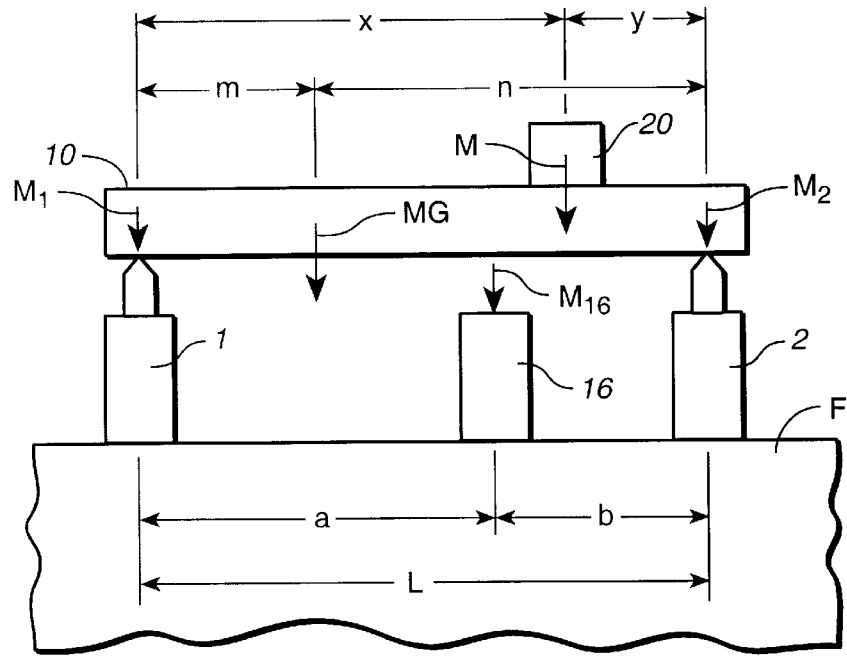
FIG._12
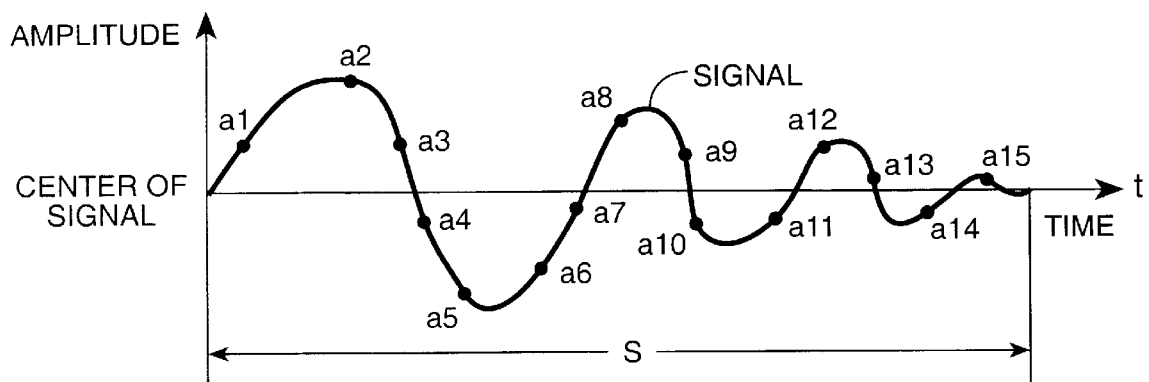
FIG._14 *(PRIOR ART)*
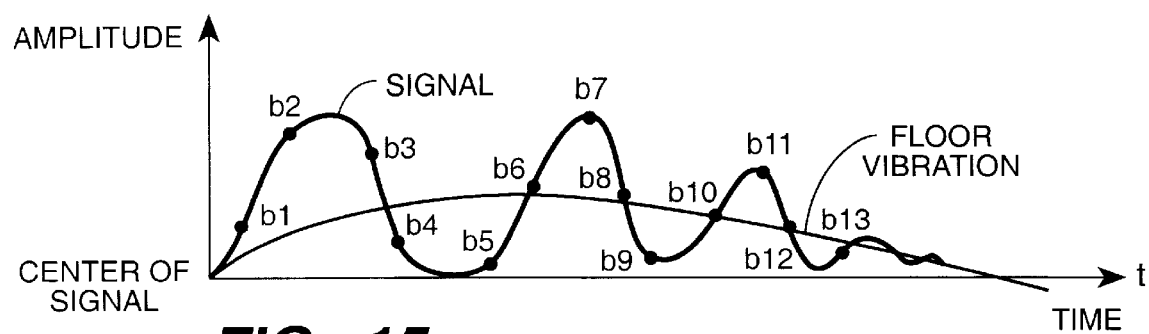
FIG._15 *(PRIOR ART)*

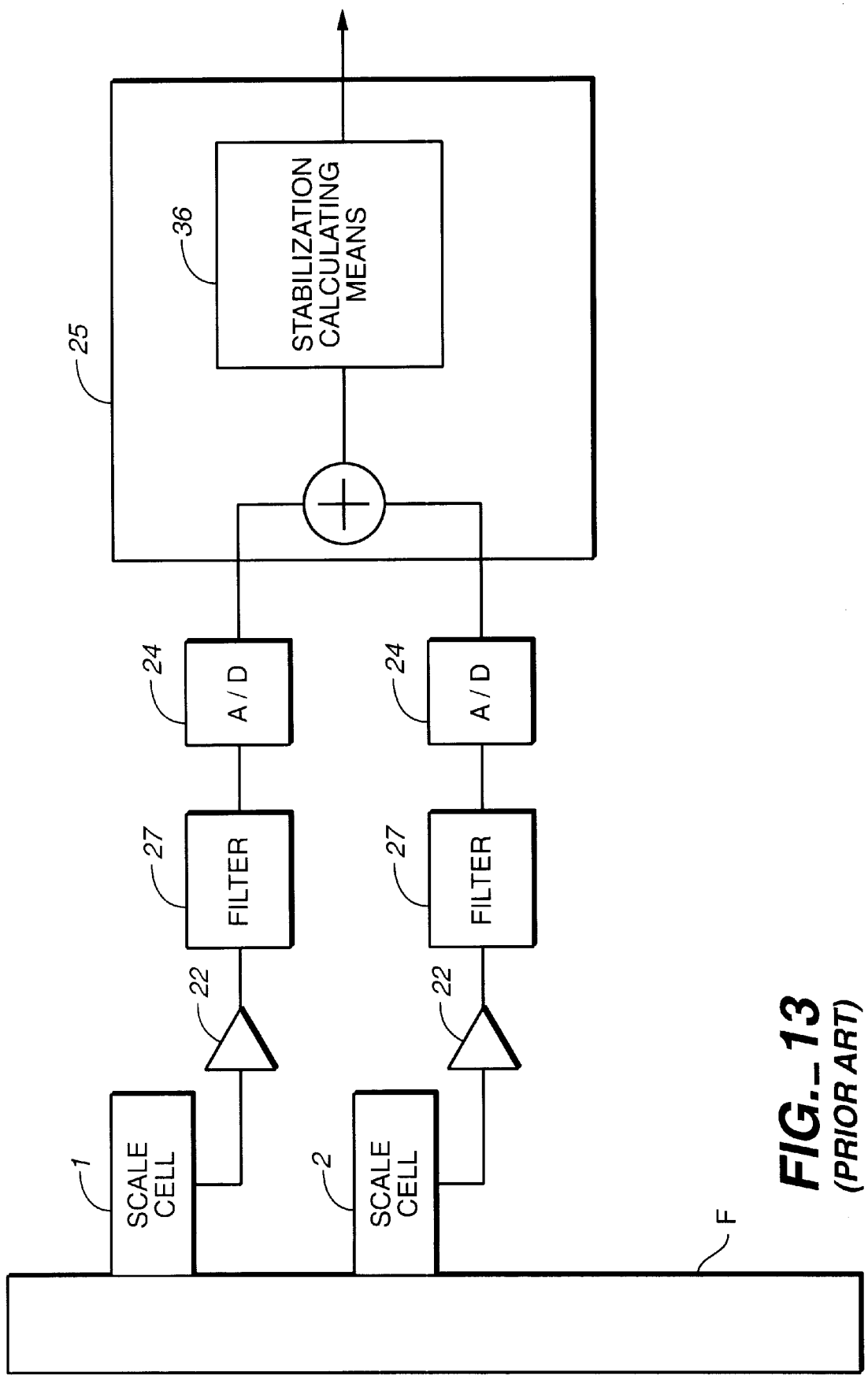
FIG._13 (PRIOR ART)

MULTI-POINT CELL TYPE WEIGHING MACHINES

This is a continuation of application Ser. No. 08/346,437 filed Nov. 29, 1994, now abandoned.

BACKGROUND OF THE INVENTION

This invention relates to a weighing machine of the so-called multi-point cell type, characterized as having a weighing table supported by a plurality of scale cells and adding the weight signals from these scale cells to measure the weight of a target object placed on the weighing table. In particular, this invention relates to such a machine capable of high-speed weighing.

Weighing machines of the multi-point cell type, as disclosed in Japanese Patent Publication Tokko 63-285941, have been in use for measuring the weight of a large or heavy target object, such as an automobile, by supporting a weighing table by a plurality of weighing cells and adding the weight signals outputted from the individual cells. Compared to weighing machines with only one cell adapted to measure the entire weight of a target object, weighing machines of the multiple-point cell type are advantageous because the size of the weighing table can be made larger since many weighing cells of about the same size can be used to support it. The scale cells are typically comprised of a deformable body with strain gauges attached thereon.

When such a weighing machine is used to measure the weight of a target object moving on a weighing conveyor, mechanical vibrations are caused to the plurality of scale cells due, for example, to the shock associated with the shift of the weight of the target object from a conveyor for its transportation to the weighing conveyor. In view of the above, it has been known, as shown in FIG. 13, to use amplifiers 22, filters (with cutoff frequency 5 Hz–10 Hz) 27 and A/D converters 24 to process weight signals outputted from a plurality of scale cells 1 and 2, to add these processed signals together by a CPU 25 and to thereafter extract a filtered signal with its high-frequency vibration components attenuated. This process is illustrated in FIG. 14.

It takes, however, a significantly long time (referred to as the stabilization time S), say, of about 200 msec until such a filtered signal becomes stabilized, and this has indeed been a source of problem in the attempt to achieve high-speed weighing. In view of the above, it has been known to carry out a stabilization routine on weight data in order to speed up a weighing process. For example, if there is a set of time-sequenced signal values $a_1, a_2, a_3, a_4, a_5, a_6, \ldots$, a final equilibrium value to which the signal values are expected to converge, may be predicted by first taking the average of $a_1$, $a_2$ and $a_3$, next taking the average of $a_2$, $a_3$ and $a_4$, then taking the average of $a_3$, $a_4$ and $a_5$ and so forth. In this manner, a partially stabilized value can be obtained within a shorter time period, say, of about 150 msec without waiting for the full stabilization time S. The overall weighing efficiency is thereby improved if such partially stabilized values are used as the stabilized weight value.

There are situations, however, where scale cells pick up the effects of environmental vibrations (to be referred to simply as "the floor vibrations") such as vibrations of the ground, building, floor and/or table on which they are set. In general, the floor vibrations have frequencies lower than those of the weighing system. Thus, they are passed through the digital filter 27 and added to the weight signals which are outputted, as shown in FIG. 15. If the averaging method described above were applied to this situation by considering time-sequenced signal values $b_1, b_2, b_3, b_4, b_5, b_6, \ldots$, the convergence would be slow because of the effects of these low-frequency components. If the cutoff frequency of the digital filters 27 is lowered in an attempt to reduce the effects of the floor vibrations, however, this will tend to increase the stabilization time S, adversely affecting the capability of the system as a whole.

Another problem to be taken into consideration is the difference in sensitivity among the plurality of scale cells, due, for example, to the fluctuations in the resistance of the strain gauges. In other words, sensitivity of each scale cell must be adjusted. Japanese Patent Publication Tokkai 63-282616 taught the technology of preliminarily measuring the sensitivity of each scale cell, storing it in a memory device and correcting weight data from the scale cells by using the stored sensitivity characteristics. According to this technology, however, it is necessary to apply the same load to all scale cells. After a weighing table is attached to the scale cells, it is practically impossible to apply the same load equally to all scale cells when the object to be weighed is incorrectly positioned.

SUMMARY OF THE INVENTION

It is therefore an object of this invention to provide a multi-point cell type weighing machine capable of weighing objects quickly and accurately.

A multi-point cell type weighing machine according to this invention, with which the above and other objects can be accomplished, may be characterized not only as supporting a weighing table by a plurality of scale cells and being adapted to add weight signals from the individual cells to thereby obtain a sum signal representing the weight of an object placed on the weighing table, but also as comprising floor vibration detecting cells set on the same floor as the scale cells, floor vibration adjusting means for outputting a corrected signal by adjusting the weight signals or the sum signal with the vibration components of vibration detection signals outputted from the floor vibration detecting cells to thereby correcting errors in the weight signals due to the floor vibrations, sensitivity calculating means for calculating output sensitivity ratio among the scale cells from outputted values from the individual weighing cells as a standard weight is placed sequentially at more different positions on the weighing table than the number of the scale cells, and sensitivity correcting means for correcting the aforementioned weight signal based on the output sensitivity ratio.

According to one embodiment of the invention, one of the floor vibration detecting cells is positioned near each of the scale cells. According to another embodiment of the invention, a plurality of floor vibration detecting cells are provided and the floor vibration adjusting means includes floor vibration calculating means for detecting vibration mode of the floor from the vibration components of the floor vibration detection signals outputted from the plurality of floor vibration detecting cells and thereby calculating vertical displacements of the floor at the positions of the scale cells and floor vibration correcting means for generating a corrected signal by subtracting components of the floor vibrations from the weight signals. According to a third embodiment of the invention, there is only one floor vibration detecting cell and it is positioned at a center position of the individual scale cells.

With a weighing machine thus structured according to the present invention, errors due to the floor vibrations on weight signals from the scale cells, when a target object is placed on the weighing table, are corrected by placing floor vibration detecting cells on the same floor as the scale cells and the sum signal is obtained after corrections are effected on the basis of the sensitivity ratio among the scale cells. Since the floor vibration components are reduced and the sum signal corrected according to the outputted sensitivity ratio is outputted, accurate weighing can be carried out quickly by a stabilization calculation process.

If each of the scale cells has one of the floor vibration detecting cells at a nearby position, each pair of mutually near cells may be considered to vibrate in the same mode. Thus, the effects of the floor vibrations can be immediately removed by directly subtracting the corresponding floor vibration detecting signal from each weight signal.

In the case of a weighing machine according to the second embodiment of the invention, the mode of vibrations of the floor is detected from the vibration components of the floor vibration detection signals outputted from the plurality of floor vibration detecting cells and the vertical displacement of the floor is calculated therefrom where each of the scale cells is positioned. The weight signals are corrected thereby and corrected signals are generated and added together. Thus, weight signals can be corrected accurately even in a situation where the floor is vibrating differently at the position of a scale cell and that of the corresponding floor vibration detecting cell. Since the limitations on where to set the floor vibration detecting cells become less stringent in this case, there is an increased degree of freedom in the design choice of the weighing machine. If a single floor vibration detecting cell is used at a center, on the other hand, the structure of the weighing machine becomes simpler.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic side view of a multi-point cell type weighing machine according to an embodiment of the invention;

FIG. 2 is a signal waveform diagram of a weight signal outputted by the weighing machine of FIG. 1;

FIG. 3 is a diagonal view of a portion of the weighing machine of FIG. 1;

FIGS. 4A and 4B are block diagrams of the signal processing unit of the weighing machine of FIG. 1;

FIG. 5 is a sectional view of another plate supporting member according to the invention;

FIG. 6 shows the shape and deformation of a load cell for explaining the theory of AFV (anti-floor vibration) technology;

FIG. 7 shows the positioning of the load cell of FIG. 6;

FIGS. 8A and 8B are block diagrams of the signal processing unit of another weighing machine according to a second embodiment of the invention;

FIG. 9 is a schematic for showing an example of vibration mode of a floor;

FIG. 10 is a diagonal view of a portion of still another multi-point cell type weighing machine according to a third embodiment of the invention;

FIGS. 11A and 11B are block diagrams of the signal processing unit of the weighing machine of FIG. 10;

FIG. 12 is a schematic side view of the weighing machine of FIGS. 10, 11A and 11B;

FIG. 13 is a block diagram of a prior art multi-point cell type weighing machine;

FIG. 14 is a graph of stabilizing signal; and

FIG. 15 is a graph of stabilizing signal with floor vibrations.

Throughout herein, those components which are substantially identical, although of machines according to different embodiments, are indicated by the same numeral.

DETAILED DESCRIPTION OF THE INVENTION

As schematically shown in FIG. 1, a multi-point cell type weighing machine according to an embodiment of the invention uses a weighing conveyor 10 serving as a weighing table, with a belt 10c stretched between a drive roller 10a, rotationally driven by a drive motor (not shown), and a follower roller 10b. Bearings 10d and 10e for the two rollers 10a and 10b are supported by a horizontally extending supporting plate 15 through vertically extending members 10f and 10g. The supporting plate 15 is in turn supported by a pair of scale cells 1 and 2 at its front and back positions. These scale cells 1 and 2 may be of the type comprising a deformable member having strain gauges attached thereto.

A target object 20 to be weighed is arranged to be brought onto the weighing conveyor 10 from a delivery conveyor 40 disposed on the upstream side such that its weight can be measured by the pair of scale cells 1 and 2 while it is transported in the direction of arrow X on the weighing conveyor 10. Weight signals $W_1$ and $W_2$, indicative of the weight values measured by and outputted from the two scale cells 1 and 2 respectively, will generally look as shown in FIG. 2, changing with time as the target object 20 is transported, and its weight can be obtained from the sum $W_1+W_2$ of these two weight signals $W_1$ and $W_2$. Because the conveyor 10 experiences a shock when the target object 20 is transferred from the delivery conveyor 40 onto the weighing conveyor 10, mechanical vibrations (or the weighing system vibrations) are generated in the scale cells 1 and 2 which support the weighing conveyor 10. This is indicated by numeral 101 in FIG. 2.

As shown more in detail in FIG. 3, the scale cells 1 and 2 are each disposed such that their axial lines 1c and 2c connecting their fixed ends 1a and 2a respectively with their free ends 1b and 2b are both perpendicular to the direction X of transportation of the object 20. These fixed ends 1a and 2a are supported by a base 5 (serving as "the floor F") respectively through fastening devices 3 and 4 to form cantilevers. Horizontal arms 8 and 9 are attached to the free ends 1b and 2b through fastening devices 3 and 4, respectively.

Numerals 11, 12, 13 and 14 indicate holders for supporting the supporting plate 15 thereon. Each of the horizontally maintained arms 8 and 9 supports two or more (two in the example shown in FIG. 3) of these holders, each comprising a conically shaped member 11b, 12b, 13b or 14b fastened by a bolt 11a, 12a, 13a or 14a. These conically shaped members 11b, 12b, 13b and 14b are pointed at one end and the supporting plate 15 is supported from below by these pointed ends at its four corners.

Two floor vibration detecting cells $16_1$ and $16_2$ are disposed near the scale cells 1 and 2, respectively, in the direction X of transportation. These two floor vibration detecting cells $16_1$ and $16_2$ are structured similarly to the scale cells 1 and 2 described above, each having one of its ends fastened through a fastening device $17_1$ or $17_2$ to the same base 5 and having a weight $18_1$ or $18_2$ fastened to the other end.

Although not shown in FIG. 1 or 3, the weighing machine is provided with a signal processing unit as schematically shown in FIG. 4A, including a CPU (such as a digital signal processor DSP) 25 shown more in detail in FIG. 4B. With reference first to FIG. 4A, weight signals outputted from the scale cells 1 and 2 are amplified by amplifiers 22, floor vibration detection signals outputted from the floor vibration detecting cells $16_1$ and $16_2$ are amplified by amplifiers 23, and these amplified signals are all inputted into a multiplexer 24, which is controlled by the CPU 25 through control signals c to selectively output these signals to an A/D converter 26. The digital weight signals will be indicated as $W_1$ and $W_2$, and the digital floor vibration detection signals will be indicated as $Y_1$ and $Y_2$.

When the signals $W_1$, $W_2$, $Y_1$ and $Y_2$ are received by the CPU 25, they are individually passed through a digital filtering means 28 having the characteristics of a low pass filter with cutoff frequency higher than 10 Hz–20 Hz for carrying out a filtering process, for example, by a convolution calculation of a known kind. The filtered signals outputted from the digital filtering means 28 will be denoted $FW_1$, $FW_2$, $FY_1$ and $FY_2$, respectively, as shown in FIG. 4B.

A sensitivity adjusting process is carried out next on the filtered signals $FW_1$, $FW_2$, $FY_1$ and $FY_2$ by a sensitivity adjusting means 52 which includes sensitivity calculating means 54 and sensitivity correcting means 56. The sensitivity calculating means 54 calculates the output sensitivity ratio between the scale cell 1 and the floor vibration detecting cell $16_1$ and the output sensitivity ratio between the scale cell 2 and the floor vibration detecting cell $16_2$ on the basis of the differences in the spring constant and the load weight (including the tare) between the scale cell 1 (or 2) and the floor vibration detecting cell $16_1$ (or $16_2$). The sensitivity correcting means 56 corrects the filtered signals $FY_1$ and $FY_2$ from the floor vibration detecting cells $16_1$ and $16_2$ on the basis of the output sensitivity ratios thus calculated to output sensitivity-corrected signals $SY_1$ and $SY_2$.

If the output sensitivity ratios between the scale cell 1 and the floor vibration detecting cell $16_1$ and between the scale cell 2 and the floor vibration detecting cell $16_2$ are preliminarily known, the filtered signals $FY_1$ and $FY_2$ may be corrected on the basis of these known ratios. As another variation of the above, corrections may similarly be effected on the filtered signals $FW_1$ and $FW_2$ from the scale cells 1 and 2 on the basis of the calculated or known output sensitivity ratios.

Next, a floor vibration adjusting means 42 carries out a subtraction process, subtracting the sensitivity-corrected signal $SY_1$ from the filtered signals $FW_1$ from the scale cell 1 and thereby outputting vibration-corrected signal $V_1$ representing the weight on the scale cell 1 from which the effects of the vertical vibrations of the floor at the position of the scale cell 1 has been removed, or $FW_1 - SY_1 = V_1$. Similarly, another floor vibration adjusting means 44 carries out another subtraction process, subtracting the sensitivity-corrected signal $SY_2$ from the filtered signals $FW_2$ from the scale cell 2 and thereby outputting vibration-corrected signal $V_2$ representing the weight on the scale cell 2 from which the effects of the vertical vibrations of the floor at the position of the scale cell 2 has been removed, or $FW_2 - SY_2 = V_2$. In summary, the CPU 25 makes uses of the floor vibration adjusting means 42 and 44 to correct the effects of the floor vibrations on the weight signals to obtain vibration-corrected signals $V_1$ and $V_2$.

When a plurality of scale cells are used, as in the example described above, it is necessary to adjust the output sensitivity of the scale cells 1 and 2 (or to carry out a span adjustment) because their output sensitivity and the gains of the amplifiers 22 and 23 may be different. For this reason, there is a span-adjustment means 60 for correcting the output sensitivity ratio between the scale cells 1 and 2 when the machine is shipped from the factory or installed at the site of its operation. The span-adjustment means 60 is provided with a sensitivity calculating means 62, a sensitivity correcting means 64 and a mode-switching means 68. The mode-switching means 68 is for switching the mode of operation of the machine in response to a command from outside between a normal weighing mode and an output sensitivity ratio calculating mode. In FIG. 4B, the machine is in the normal weighing mode with software switches 63 in the OFF positions as shown. If the switches 63 are in the ON positions, the machine will be in the output sensitivity calculating mode. In general, the machine is switched to the output sensitivity calculating mode to calculate output sensitivity ratios when it is delivered from the factory or installed at a site but it is then switched to the normal weighing mode and kept in this mode thereafter.

Next, there will be described the operations of the sensitivity calculating means 62 in the output sensitivity calculating mode. First, a standard weight 50 (with weight W) is placed at an arbitrary position on the supporting plate 15.

If the output differentials from the vibration-corrected signals $V_1$ and $V_2$ are $\Delta V_{A1}$ and $\Delta V_{B1}$, they are related to the output sensitivity $S_A$ and $S_B$ of the scale cells 1 and 2 as follows:

$$S_A \times \Delta V_{A1} + S_B \times \Delta V_{B1} = W. \quad (1)$$

If the output differentials are $\Delta V_{A2}$ and $\Delta V_{B2}$ when the standard weight 50 is moved to another arbitrary position on the supporting plate 15, $$S_A \times \Delta V_{A2} + S_B \times \Delta V_{B2} = W. \quad (2)$$

From these two equations, one can calculate the output sensitivity ratio $S_{AB}$ between the scale cells 1 and 2 from (1) and (2) as:

$$S_{AB} = S_B/S_A = -(\Delta V_{A1} - \Delta V_{A2})/(\Delta V_{B1} - \Delta V_{B2}) \quad (3)$$

Thus, the output sensitivity of the scale cells 1 and 2 can be obtained as follows:

$$S_A = W/(\Delta V_{A1} + S_{AB} \times \Delta V_{B1}), \quad (4)$$

$$S_B = S_{AB}/S_A. \quad (5)$$

The value of this output sensitivity ratio $S_{AB}$ between the scale cells 1 and 2 is stored in a non-volatile memory 66 contained in the CPU 25.

Next, after the mode of operation is switched from the output sensitivity calculating mode to the normal weighing mode, the sensitivity correcting means 64 uses this output sensitivity ratio $S_{AB}$ stored in the memory 66 to carry out a sensitivity correction process. This is done in the normal weighing mode of operation by multiplying the vibration-corrected signals $V_1$ and $V_2$ by the output sensitivity ratio $S_{AB}$ serving as the coefficient for sensitivity ratio correction and thereby outputting sensitivity-corrected signals $DV_1$ and $DV_2$. Thus, the vibration-corrected signals $V_1$ and $V_2$ are corrected according to the output sensitivity of the plurality of scale cells.

The method according to this invention has been explained above with reference to an example with only two scale cells 1 and 2. In general, in a situation where the weighing table is supported by N scale cells where N is any integer equal to or greater than 2, Equations (1) and (2) given above is replaced by $$\begin{bmatrix} \Delta V_{11} & \Delta V_{21} & \cdots & \Delta V_{j1} & \cdots & \Delta V_{N1} \\ \Delta V_{11} & \Delta V_{21} & \cdots & \Delta V_{j2} & \cdots & \Delta V_{N2} \\ \cdots & \cdots & \cdots & \cdots & \cdots & \cdots \\ \Delta V_{1k} & \Delta V_{2k} & \cdots & \Delta V_{jk} & \cdots & \Delta V_{Nk} \\ \cdots & \cdots & \cdots & \cdots & \cdots & \cdots \\ \Delta V_{1N} & \Delta V_{2N} & \cdots & \Delta V_{jN} & \cdots & \Delta V_{NN} \end{bmatrix} \begin{bmatrix} S_1 \\ S_1 \\ \cdots \\ S_j \\ \cdots \\ S_N \end{bmatrix} = \begin{bmatrix} W \\ W \\ \cdots \\ W \\ \cdots \\ W \end{bmatrix} \quad (6)$$

or a matrix equation $$W = VS \quad (6A)$$

where $$V = \begin{bmatrix} \Delta V_{11} & \Delta V_{21} & \cdots & \Delta V_{j1} & \cdots & \Delta V_{N1} \\ \Delta V_{12} & \Delta V_{21} & \cdots & \Delta V_{j2} & \cdots & \Delta V_{N2} \\ \cdots & \cdots & \cdots & \cdots & \cdots & \cdots \\ \Delta V_{1k} & \Delta V_{2k} & \cdots & \Delta V_{jk} & \cdots & \Delta V_{Nk} \\ \cdots & \cdots & \cdots & \cdots & \cdots & \cdots \\ \Delta V_{1N} & \Delta V_{2N} & \cdots & \Delta V_{jN} & \cdots & \Delta V_{NN} \end{bmatrix}$$

$$S = \begin{bmatrix} S_1 \\ S_1 \\ \cdots \\ S_j \\ \cdots \\ S_N \end{bmatrix} \quad W = \begin{bmatrix} W \\ W \\ \cdots \\ W \\ \cdots \\ W \end{bmatrix}$$

In the above, $\Delta V_{jk}$ indicates the output differential of the jth scale cell when the weight is placed for the kth time (or at the kth position), and $S_j$ indicates the output sensitivity of the jth scale cell. Thus, one obtains from (6A)

$$S = V^{-1}W \quad (7A)$$

and the output sensitivity of each scale cell can be determined. In summary, the weight must be placed at N different positions in order to obtain N mutually independent simultaneous equations.

In general, if a target object to be weighed is placed at an off-center position on a supporting table, the supporting table may tend to tilt or experience a strain. According to this invention, since the supporting table 15 is supported by pointed ends of the conically shaped members 11b, 12b, 13b and 14b, the vertical components of the forces therethrough are directly transmitted to the scale cells 1 and 2 but their horizontal components contribute only to the sliding of the members 11b, 12b, 13b and 14b. Similarly, no torque which may be experienced by the supporting table 15 will contribute a vertical force. In summary, the scale cells output weight signals representing partial weights of the target object distributed according to the distances of the center of gravity of the target object from the scale cells 1 and 2.

FIG. 5 shows at 69 another embodiment of the plate supporting members 11, 12, 13 and 14 characterized as having attaching devices 71 and 72 such as bolts attached to mutually opposite ends of an elastic member 70 made, for example, of rubber, one of the attaching devices (71) being adapted to be fastened to the supporting table 15 and the other attaching device (72) to either of the arms 8 and 9. With plate supporting members thus structured, any force tending to tilt the supporting table 15, such as caused by the positioning of the target object or the deformation of the table 15 itself, is absorbed by the deformation of the elastic member 70. As a result, only vertical components of forces are communicated to the scale cells. In other words, accurate weighing can be accomplished independently of the position at which the target object may be placed on the supporting table. If the plate supporting members 69 are made of a vibration-absorbing rubber or alloy material, furthermore, they can absorb external vibrations and thereby prevent errors due to vibrations.

As shown further in FIG. 1, the CPU 25 serves to add the sensitivity-corrected signals $DV_1$ and $DV_2$ together by an adder 46 as partial weight data representing the shared load on the scale cells 1 and 2, outputting an added weight signal BW to a stabilization calculating means 36 for carrying out stabilization calculations and outputting a stabilized added signal AW, as shown in FIG. 4A. In summary, The present invention makes it possible to quickly obtain stabilized output data which have been corrected according to the output sensitivity of the scale cells 1 and 2 and of which low-frequency floor vibration components are attenuated, independently of whether the target object is placed at an off-center position on the weighing plate. The value of a measured weight thus obtained may be displayed on a display device (not shown) or printed out by a printer (not shown).

It now goes without saying that many variation and modifications are possible on the embodiment of the invention described above, For example, although FIG. 4B shows a CPU 25 with digital filtering means 28 on the upstream side of the adder 46, the filtering operation may be carried out after signals are added by the adder 46. As another example, although a single A/D converter 26 is shown in FIG. 4A, a plurality of A/D converters may be provided, each corresponding to one of the scale cells or the floor vibration detecting cells. As still another example, although the sensitivity correcting means 64 was shown as carrying out corrections on the vibration-corrected signals $V_1$ and $V_2$, the sensitivity correction may be effected on weight signals before the vibration corrections.

Multi-point cell type weighing machines according to a second embodiment of the invention may be characterized as carrying out floor vibration correction by calculating the vibration mode of the floor. Before a machine according to this embodiment is described, however, its basic principle will be explained first.

FIG. 6 shows the structure of the scale and floor vibration detecting cells 1 (2) and 16 (hereinafter referred to as "the load cell") of the weighing machine described above. A load cell of this type is provided with four strain gauges 53 attached individually near one of four notches 51 formed in a central opening therethrough to detect its deformation in terms of the strains measured thereby. These four strain gauges 53 form a Wheatstone bridge (not shown) which is adapted such that its output changes only if the load cell 1 (2, 16) is deformed into a parallelogram as shown by a broken line. In other words, there is no change in its output if the load cell 1 (2, 16) undergoes any other kind of deformation. Thus, when there is a relative deformation between the fixed side 1a where it is attached to the floor and the free side 1b where a load is applied (indicated by an arrow), only the component of a parallelogrammic deformation is detected. When such load cells are used, therefore, only the perpendicular (vertical) components of the vibration modes of the floor need to be considered.

Consider, for example, a load cell 1 (2, 16) affixed at a position P(x, y) on an X-Y plane as shown in FIG. 7. The movement of the X-Y plane can be described in terms of the rotation around the X-axis, the rotation around the Y-axis and the motion along an axis (the Z-axis) perpendicular to both the X-axis and the Y-axis. The other modes of motion will not be discussed here because they are not detected by the load cell 1 (2, 16). Now, let the motion in the Z-direction caused by a rotary motion around the X-axis be denoted by B(t), that caused by a rotary motion around the Y-axis by A(t) and the motion in the direction of the Z-axis by C(t). Of the output signal from the load cell at position P, the component $V_p(t)$ contributed by the floor vibration is given as follows:

$$V_p(t)=xA(t)+yB(t)+C(t) \qquad (8)$$

In order to obtain the values of A(t), B(t) and C(t) in (8), it is theoretically sufficient to detect the floor motion at three positions not in a collinear relationship and solve linear simultaneous equations with three unknowns. In practice, however, motion is detected at more than three positions because the output from each load sensor contains some measurement errors, and A(t), B(t) and C(t) may be obtained preferably by a method of least squares.

In general, a method, such as the one described above, of detecting the vibration modes of a floor and reducing the vibration components of scale cells at arbitrary positions thereon is referred to as a multi-point AFV (anti-floor vibration) process. If scale cells are disposed on a plane, or two-dimensionally, floor vibrations are detected by floor vibration detecting cells at three or more positions not in collinear relationship on the plane. The vibration modes of the floor are detected from these individual vibrations thus detected, and the vibration components of the floor at the positions of the scale cells are obtained therefrom and subtracted from the weight values outputted from these scale cells. If the scale cells are aligned on a single line, or one-dimensionally, floor vibrations are detected by floor vibration detecting cells at two or more different positions on the line connecting the scale cells, and the vibration components of the floor at the positions of the scale cells are similarly obtained and subtracted from the weight values being outputted therefrom. Vibration components can be subtracted similarly when the scale cells are scattered all over.

FIGS. 8A and 8B show the signal processing unit of another weighing machine of the multi-point cell type according to a second embodiment of the invention characterized as being adapted to calculate the mode of floor vibrations. The weighing machine, shown as an example in FIGS. 8A and 8B, has a plural number m of scale cells 1–m, another plural number n of floor vibration detecting cells $16_1$–$16_n$, amplifiers 22 and 23, a multiplexer 24, an A/D converter 26 and a CPU 25'. For the convenience of explanation, the individual components which are substantially identical to those shown in FIGS. 4A and 4B and explained above with reference thereto are herein indicated by the same numeral and their individual structures and functions will not be described again. The CPU 25', which is shown in FIG. 8A, includes a floor vibration adjusting means 80 provided with a floor vibration correcting means 82 and a floor vibration calculating means 84. The floor vibration calculating means 84 is provided with a floor vibration mode calculating means for calculating the mode of vibrations of the floor and a point vibration calculating means for calculating the floor vibration at the known positions of the scale cells from the calculated mode of vibrations of the floor. In other respect, the signal processing unit of FIGS. 8A and 8B are the same as that shown in FIGS. 4A and 4B.

Although the floor vibration detecting cells $16_1$ and $16_2$ are required to be placed adjacent to the corresponding one of the scale cells 1 and 2 according to the first embodiment of the invention shown in FIGS. 4A and 4B, the floor vibration detecting cells $16_1$–$16_n$ may be placed at any positions as long as they are on the same floor F as the scale cells 1–m. In other words, the second embodiment of the invention is advantageous in that there is an increased degree of freedom in the design of a machine because the floor vibration detecting calls $16_1$–$16_n$ may be farther away from any of the scale cells 1–m.

With reference still to FIGS. 8A and 8B, after weight signals outputted from the scale cells 1–m and floor vibration detection signals outputted from the floor vibration detecting cells $16_1$–$16_n$ are amplified by the amplifiers 22 and 23, respectively, they are passed through the multiplexer 24, converted into digital signals $W_1$–$W_m$ (digital weight signals) and $Y_1$–$Y_n$ (digital floor vibration detection signals), respectively, and inputted to the CPU 25'. The CPU 25' uses digital filtering means 28 to carry out a filtering process on these signals $W_1$–$W_m$ and $Y_1$–$Y_n$ and produce filtered signals $FW_1$–$FW_m$ and $FY_1$–$FY_n$.

The vibration components of the filtered floor vibration detection signals $FY_1$–$FY_n$ are utilized by the floor vibration mode calculating means of the floor vibration calculating means 84 to calculate the vibration component $V_p(t)$ of (8). After this floor vibration mode calculating process is carried out, the mode of floor vibration thus calculated is used by the point vibration calculating means to carry out a point vibration calculating process by producing displacement signals $M_1$–$M_m$ indicative of the vertical displacements of the floor at known positions of the scale cells 1–m. A sensitivity adjusting means 52 carries out a sensitivity adjusting process on these displacement signals $M_1$–$M_m$ and thereby outputs sensitivity-adjusted displacement signals $S_1$–$S_m$.

From the displacement signals $S_1$–$S_m$ thus calculated on the basis of the mode of floor vibration, the floor vibration correcting means 82 corrects individually the filtered signals $FW_1$–$FW_m$ outputted from the scale cells 1–m by subtracting the displacements according to the displacement signals $S_1$–$S_m$ from the filtered signals $FW_1$–$FW_m$, thereby outputting vibration-corrected signals $V_1$–$V_m$.

In summary, the vibration mode of the floor is determined from the vibration components of floor vibration detection signals $Y_1$–$Y_n$ outputted from the plurality of floor vibration detecting cells $16_1$–$16_n$ set on the same floor as the scale cells 1–m, and the vertical displacements of the floor at the positions of the scale cells 1–m are subtracted from the individual weight signals $W_1$–$W_m$ to output the vibration-corrected signals $V_1$–$V_m$. Since the subtractions and corrections are effected digitally according to the embodiment described above, more accurate corrections are possible than if they were carried out by using analog circuits because there are fluctuations in the characteristics of individual parts and elements of analog circuits.

FIG. 9 shows an example of mode of floor vibration being detected by floor vibration detecting cells $16_1$–$16_3$ at three positions on the floor F. The floor vibrations of the floor F at the positions of the scale cells 1–m are calculated from the slope of the surface 103, representing the vibration mode of the floor F.

There are situations where the floor vibrations are so small that the accuracy of measured weight is adversely affected by errors in the calculations, for example, in an attempt to effect corrections. For this reason, the process of correcting effects of floor vibrations is automatically inhibited if the vibration components of the outputs from the floor vibration detecting cells are smaller than a predefined standard level. Although FIG. 8A shows a single A/D converter 26, a plurality of such A/D converters may be used, one for each of the scale and floor vibration detecting cells. Moreover, analog filters may be used instead of, or in addition to, the digital filtering means 28 of FIG. 8B. In such a situation, the analog filters are connected at positions 39 shown by dotted lines.

FIG. 10 shows still another multi-point cell type weighing machine according to a third embodiment of the invention characterized as having only one floor vibration detecting cell 16 at an arbitrary position between a plurality (two in the example shown in FIG. 10) of scale cells 1 and 2 where a target object is intended to be weighed. As shown in FIG. 11A, the signal processing unit of this weighing machine includes amplifiers 22 and 23, a multiplexer 24 and an A/D converter 26 such that weight signals from the scale cells 1 and 2 are amplified by the amplifiers 22, an analog floor vibration detection signal from the single floor vibration detecting cell 16 is amplified by amplifier 23, and these amplified signals are passed through the multiplexer 24 into the A/D converter 26 to be converted into digital weight and analog signals $W_1$, $W_2$ and Y, respectively, and to be inputted to a CPU 25". As shown in FIG. 11B, the CPU 25" carries out filtering processes on these signals by digital filtering means 28 and outputs filtered signals $FW_1$, $FW_2$ and FY therefrom.

Next, the CPU 25" carries out a sensitivity adjusting process on these filtered signals $FW_1$, $FW_2$ and FY by a sensitivity adjusting means 52. After sensitivity correction between the scale cells 1 and 2 is effected by a span adjusting means 60 on the sensitivity-adjusted filtered signals $FW_1$ and $FW_2$, they are added together by an adding means 46 to produce an added signal TW. Next, a floor vibration adjusting means 48 subtracts the sensitivity-adjusted filtered signal FY from the added signal TW to thereby output an added weight signal BW. As explained above, a stabilization calculation is carried out on this added weight signal BW and a stabilized weight signal AW is outputted. Sensitivity adjustment is thus carried out between each scale cell 1 (2) and the floor vibration detecting cell 16 to reduce the floor vibration components and to provide stabilized output data adjusted according to the output sensitivity ratio between the scale cells 1 and 2.

As shown in FIG. 11B, the sensitivity adjusting means 52 for carrying out sensitivity adjusting processes on the filtered signals $FW_1$, $FW_2$ and FY includes sensitivity calculating means 54 and sensitivity correcting means 56. Their operations will be explained in detail next with reference to FIG. 12, which is a schematic side view of the weighing machine of FIGS. 10, 11A and 11B.

The operations of the sensitivity calculating means 54 will be explained first. With reference to FIG. 12, $M_G$ indicates the weight and the position of the center of gravity of the weighing conveyor 10, $M_1$ and $M_2$ are the loads on the scale cells 1 and 2, L is the length of the weighing conveyor 10, m and n are the distances of the center of gravity $M_G$ from the scale cells 1 and 2, x and y are the distances of the target object 20 of weight M from the scale cells 1 and 2, and b are the distances of the floor vibration detecting cell 16 from the scale cells 1 and 2. By balancing the torque around the scale cells 1 and 2, we obtain $M_1=(yM+nM_G)/L$ and $M_2=(xM+mM_G)/L$. If the spring constants of the scale and floor vibration detecting cells 1, 2 and 16 are $k_1$, $k_2$ and $k_{16}$ and the weight 18 on the floor vibration detecting cell 16 is $M_{16}$, the output sensitivity ratios $\alpha_1$ and $\alpha_2$ of the scale cells 1 and 2 with reference to the floor vibration detecting cell 16 are given by $\alpha_1=M_1k_{16}/M_{16}k_1$ and $\alpha_2=M_2k_{16}/M_{16}k_2$ if it is assumed that the frequencies of the floor vibrations detected by the floor vibration detecting cell 16 are sufficiently lower than the characteristic frequencies of the cell systems and hence the output sensitivity ratios are not influenced by the characteristic vibrations. on the basis of the output sensitivity ratios $\alpha_1$ and $\alpha_2$ thus calculated, the sensitivity correcting means 56 carries out sensitivity correction process on the filtered signals $FW_1$, $FW_2$ and FY. If the outputs from the scale cells due to the floor vibrations are $Z_1$ and $Z_2$, the floor vibration portion $Z_{16}$ (outputted value of the filtered signal FY) at the output sensitivity of the floor vibration detecting cell 16 at its position obtained from $Z_1$ and $Z_2$ is:

$$Z_{16}=(bZ_1/\alpha_1+aZ_2/\alpha_2)/L=b(M_{16}k_1/(yM+nM_G)k_{16})Z_1 a(M_{16}k_2/(xM+mM_G)k_{16})Z_2 \qquad (10)$$

Since the output values $O_1$ and $O_2$ of the filtered weight signals $FW_1$ and $FW_2$ from the scale cells 1 and 2 when the target object 20 is loaded are each the sum of the load weight and the floor vibration portion, $$O_1=(yM+nM_G)/L+Z_1,$$
$$O_2=(xM+mM_G)/L+Z_2. \qquad (11)$$

When the weight M of the target object 20 is added to the output condition of the scale cells 1 and 2 against the floor vibrations, if the conditions b=y=n, a=x=m and $k_1=k_2=k$ hold, we obtain:

$$Z_{16}=(M_{16}k/(M+M_G)k_{16})(Z_1+Z_2) \qquad (12)$$

Since the sum of $O_1$ and $O_2$ is the output O of the weighing machine, we obtain from (9) and (11):

$$O=O_1+O_2=M+M_G+Z_1Z_2.$$

Thus, the weight M of the target object 20 can be obtained as follows from this and (12):

$$M=O-(M_G+((M+M_G)k_{16}/M_{16}k)Z_{16})$$

Thus, the weight M of the target object 20 can be obtained by a very simple formula, and this is makes a high-speed weighing possible. Since only one floor vibration detecting cell 16 is employed, furthermore, the structure of the machine is simplified.

Although the target object 20 is weighed while being transported on a weighing conveyor in all of the embodiments of the invention described above, this is not intended to limit the scope of the invention. This invention can be equally well applied to situations where the target object 20 is weighed in a stationary state.

This invention has been described above with reference to only a limited number of examples, but these examples are intended to be illustrative, and not as be limitative. Many modifications and variations should be understood to be within the scope of the invention. For example, A/D converter need not be placed downstream of the multiplexer in any of the embodiments. The holders 11, 12, 13 and 14 for supporting the supporting plate 15 need not necessarily be structured as shown in FIG. 5. All such modifications and variations that may be apparent to a person skilled in the art are intended to be included within the scope of the invention.

What is claimed is:

1. A method of weighing an object by means of a weighing machine having scale cells and floor vibration detecting cells installed on a floor, said method comprising the steps of:

causing said object to be on a table supported by a plural number of said scale cells, thereby causing said scale cells to output weight signals indicative of weight values individually measured thereby, and receiving vibration signals from said floor vibration detecting cells indicative of vibrations of said floor;

adjusting said weight signals to obtain adjusted weight signals by carrying out both correction of said vibration signals by sensitivity relationship between said scale cells and said floor vibration detecting cells to correct said vibration signals and said weight signals and correction of said weight signals by sensitivity relationship among said scale cells; and obtaining a total weight signal indicative of the true weight of said object by adding together said adjusted weight signals after both said corrections are carried out.

2. The method of claim 1 further comprising the step of causing said object to travel horizontally on said table while said weight signals and said vibration signals are received.

3. The method of claim 1 wherein said floor defines a plane and the step of carrying out said corrections includes the steps of:

determining vibration mode of said plane of said floor from said vibration signals;

calculating vibration components of said floor at said scale cells on the basis of said vibration mode;

adjusting said vibration components by the sensitivity relationship between said scale cells and said floor vibration detecting cells to thereby obtain sensitivity-adjusted vibration components;

correcting said weight signals by said sensitivity-adjusted vibration components to thereby obtain vibration-corrected weight signals indicative of vibration-corrected weight values; and adjusting said vibration-corrected weight signals by the sensitivity relationship among said scale cells to thereby generate said adjusted weight signals.

4. The method of claim 3 wherein said vibration mode of said plane is determined by the steps of:

defining a rectilinear coordinate system with an x-axis and a y-axis in said plane;

defining time-dependent functions $A(t)$, $B(t)$ and $C(t)$ such that $xA(t)+yB(t)+C(t)$ represents the vertical displacement of said plane at time t at a position with coordinates x and y;

obtaining, at time t, linear simultaneous equations for said functions $A(t)$, $B(t)$, and $C(t)$ from said vibration signals and the positions of said floor vibration detecting cells; and solving said linear simultaneous equations.

5. The method of claim 1 wherein said total weight signal is one of a plurality of total weight signals, said method further comprising the step of averaging said plurality of total weight signals.

6. The method of claim 1 wherein said sensitivity relationship among said scale cells is determined by placing a standard weight at a larger number of places on said table than the number of scale cells to obtain output sensitivity ratios among said cells from outputted values from said scale cells.

7. A weighing machine comprising:

a table for supporting thereon an object to be weighed;

scale cells set on a floor and supporting said table for outputting weight signals indicative of weight values individually measured thereby;

floor vibration detecting cells which are set on said floor for detecting vibrations of said floor and outputting floor vibration signals indicative of said detected floor vibrations;

weight signal adjusting means for adjusting said weight signals to obtain adjusted weight signal by carrying out both correction of said vibration signals by sensitivity relationship between said scale cells and said floor vibration detecting cells to correct said floor vibration signals and said weight signals and correction of said weight signals by sensitivity relationship among said scale cells; and adding means for adding together said adjusted weight signals after both said corrections are carried out by said weight signal adjusting means to thereby obtain a total weight signal indicative of the true weight of said object.

8. The weighing machine of claim 7 wherein said table includes a conveyor means for causing said object to move horizontally on said table, said weighing machine being adapted to weigh said object while said object moves on and with said conveyor means.

9. The weighing machine 7 wherein said weight signal adjusting means include:

vibration signal adjusting means for carrying out correction of said vibration signals by sensitivity relationship between said scale cells and said floor vibration detecting cells, thereby outputting sensitivity-adjusted vibration components and correcting said weight signals by said sensitivity-adjusted vibration components to thereby output vibration-corrected weight signals indicative of vibration-corrected weight values; and sensitivity-adjusting means for adjusting said vibration-corrected weight signals by sensitivity relationship among said scale cells to thereby output said adjusted weight signals.

10. The weighing machine of claim 7 wherein said weight signal adjusting means include:

vibration signal adjusting means for determining vibration mode of said floor from said floor vibration signals, calculating vibration components of said floor at said scale cells from said vibration mode, adjusting said vibration components by sensitivity relationship between said scale cells and said vibration detecting cells to thereby output sensitivity-adjusted vibration components, and correcting said weight signals by said sensitivity-adjusted vibration components to thereby output vibration-corrected weight signals indicative of vibration-corrected weight signals; and sensitivity-adjusting means for adjusting said vibration-corrected weight signals by sensitivity relationship among said scale cells to thereby output said adjusted weight signals.

11. The weighting machine of claim 10 wherein said floor defines a plane and said vibration adjusting means include mode calculating means for defining a rectilinear coordinate system with an x-axis and a y-axis in said plane, defining time-dependent functions $A(t)$, $B(t)$ and $C(t)$ such that $xA(t)+yB(t)+C(t)$ represents the vertical displacement of said plane at time t at a position with coordinates x and y in said coordinate system, obtaining at time t linear simultaneous equations for said functions $A(t)$, $B(t)$, and $C(t)$ from said floor vibration signals and the positions of said floor vibration detecting cells, and solving said linear simultaneous equations.

12. The weighing machine of claim 9 wherein each of said floor vibration detected cells is placed near a corresponding one of said scale cells.

* * * * *